United States Patent
Jibbe et al.

(10) Patent No.: US 8,732,520 B2
(45) Date of Patent: May 20, 2014

(54) CLUSTERED ARRAY CONTROLLER FOR GLOBAL REDUNDANCY IN A SAN

(75) Inventors: Mahmoud K. Jibbe, Wichita, KS (US); Britto Rossario, Bangalore (IN); Senthil Kannan, Pondicherry (IN); Ciril T. Ignatious, Bangalore (IN)

(73) Assignee: LSI Corporation, San Jose, CA (US)

( * ) Notice: Subject to any disclaimer, the term of this patent is extended or adjusted under 35 U.S.C. 154(b) by 458 days.

(21) Appl. No.: 13/080,808

(22) Filed: Apr. 6, 2011

(65) Prior Publication Data
US 2012/0260127 A1  Oct. 11, 2012

(51) Int. Cl.
*G06F 11/00* (2006.01)
(52) U.S. Cl.
USPC ............................................ 714/6.21
(58) Field of Classification Search
USPC ............................................ 714/6.21
See application file for complete search history.

(56) References Cited

U.S. PATENT DOCUMENTS

| | | | |
|---|---|---|---|
| 7,694,072 B2 | 4/2010 | Nehse | 711/114 |
| 7,730,267 B2 | 6/2010 | Pepper | 711/152 |
| 7,870,417 B2 | 1/2011 | Blinick et al. | 714/4 |
| 7,908,513 B2 | 3/2011 | Ogasawara et al. | 714/9 |
| 7,917,696 B2 | 3/2011 | Peters et al. | 711/114 |
| 2004/0006612 A1* | 1/2004 | Jibbe et al. | 709/223 |
| 2005/0028028 A1* | 2/2005 | Jibbe | 714/6 |
| 2009/0210620 A1* | 8/2009 | Jibbe et al. | 711/114 |

\* cited by examiner

*Primary Examiner* — Yair Leibovich
(74) *Attorney, Agent, or Firm* — Christopher P. Maiorana, PC

(57) ABSTRACT

An apparatus comprising a first of a plurality of array modules and a second of a plurality of array modules. The first of the plurality of array modules may be configured to connect a first one or more of a plurality of host devices to a first one or more of a plurality of storage arrays. The first array module may comprise a primary controller and a secondary controller. The second of the plurality of array modules may be configured to connect a second one or more of the plurality of host devices to a second one or more of the plurality of storage arrays. The second array module may comprise a primary controller and a secondary controller. Control of access to the storage arrays may be transferred to the secondary controller of the first array module during a failure of the primary controller of the first array module.

18 Claims, 4 Drawing Sheets

US 8,732,520 B2

CLUSTERED ARRAY CONTROLLER FOR GLOBAL REDUNDANCY IN A SAN

FIELD OF THE INVENTION

The present invention relates to data storage generally and, more particularly, to a method and/or apparatus for implementing a clustered array controller for global redundancy in a SAN.

BACKGROUND OF THE INVENTION

Conventional storage arrays are often implemented with two controllers. One controller is for redundancy. The disk drive enclosures are directly connected to the controllers. Such an implementation poses a limit on the number of drives that can be accessed by a given storage array. In addition, only one controller can be used for redundancy and load sharing for the input/output (I/O) to the storage array.

It would be desirable to implement a clustered array controller for global redundancy in a Storage Area Network (SAN) that extends the level of controller redundancy and/or load sharing.

SUMMARY OF THE INVENTION

The present invention concerns an apparatus comprising a first of a plurality of array modules and a second of a plurality of array modules. The first of the plurality of array modules may be configured to connect a first one or more of a plurality of host devices to a first one or more of a plurality of storage arrays. The first array module may comprise a primary controller and a secondary controller. The second of the plurality of array modules may be configured to connect a second one or more of the plurality of host devices to a second one or more of the plurality of storage arrays. The second array module may comprise a primary controller and a secondary controller. Control of access to the storage arrays may be transferred to the secondary controller of the first array module during a failure of the primary controller of the first array module.

The objects, features and advantages of the present invention include providing a clustered array controller for global redundancy in a SAN that may provide (i) one or more N-way clustered controllers, (ii) multiple active controllers for a particular Logical Unit Number (LUN) or volume, (iii) multiple passive controllers for a particular LUN, (iv) direct attachment of drive enclosures to a storage network switch, (v) a fiber-channel (FC) interposer for drive enclosure modules to present a number of Serial Attached SCSI (SAS) drives as a set of FC drives in SAN, (vi) an N-way active controller ownership to implement a performance boost and/or (vii) multiple passive controllers for implementing highest LUN availability in a SAN.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide controller redundancy and/or load sharing in an N-way clustered controller that may be implemented in a Storage Area Network (SAN). A variety of storage protocols may be implemented. The controllers may access a back end disk drive enclosure through the storage network fabric cloud. A Logical Unit Number (LUN) and/or volume may be generated using multiple active controllers sharing the input/output (I/O) load, a single active controller and/or multiple passive controllers (for redundancy). The controllers may act as target devices for multiple initiators of different available storage protocols.

Figure 1:
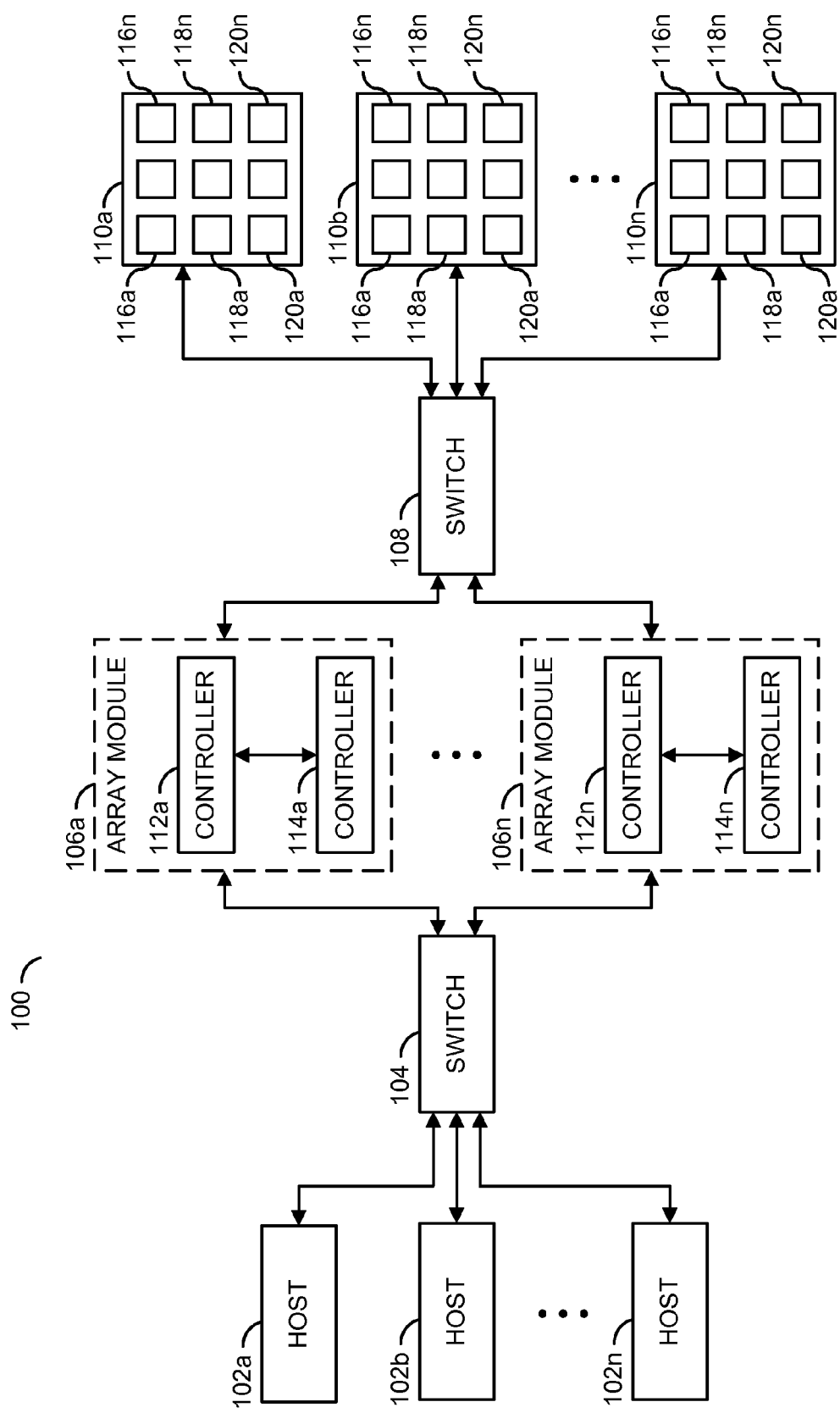
FIG. 1 is a block diagram illustrating an implementation of the present invention.

Referring to FIG. 1, a block diagram of a system 100 is shown in accordance with a preferred embodiment of the present invention. The system 100 may implement an N-way controller cluster. The system 100 generally comprises a plurality of blocks (or circuits) 102a-102n, a block (or circuit) 104, a plurality of blocks (or circuits) 106a-106n, a block (or circuit) 108 and a plurality of blocks (or circuits) 110a-110n. Each of the blocks 102a-102n may be implemented as a host. The block 104 may be implemented as a switch. In one example, the block 104 may be a multiprotocol switch. Each of the blocks 106a-106n may be implemented as an array module. The block 108 may be implemented as a switch. In one example, the block 108 may be a multiprotocol switch. Each of the blocks 110a-110n may be implemented as a number of storage devices (e.g., a storage array). Each of the plurality of blocks 106a-106n generally comprises a block (or circuit) 112 and a block (or circuit) 114. The blocks 112a-112n may be implemented as controllers. The blocks 114a-114n may be implemented as controllers. The blocks 112a-112n and/or 114a-114n may be implemented as hardware, software or a combination of hardware and/or software.

Each of the storage arrays 110a-110n may have a number of storage devices (e.g., drives) 116a-116n, a number of storage devices (e.g., drives) 118a-118n and a number of storage devices (e.g., drives) 120a-120n. One or more of the drives 116a-116n, 118a-118n and/or 120a-120n may form a volume. One or more volumes may be formed. The volumes may be referenced using a logical unit number (LUN).

In one example, each of the storage devices 116a-116, 118a-118n, and 120a-120n may be implemented as a single flash device, multiple flash devices, and/or one or more drives/enclosures (e.g., HDDs). In one example, each of the storage devices 116a-116, 118a-118n, and 120a-120n may be implemented as one or more non-volatile memory devices and non-volatile memory based storage devices (e.g., flash memory, flash-based solid state devices (SDD), etc.). The storage devices 116a-116, 118a-118n, and 120a-120n may be implemented as a combination of HDDs and/or SSDs.

Figure 2:
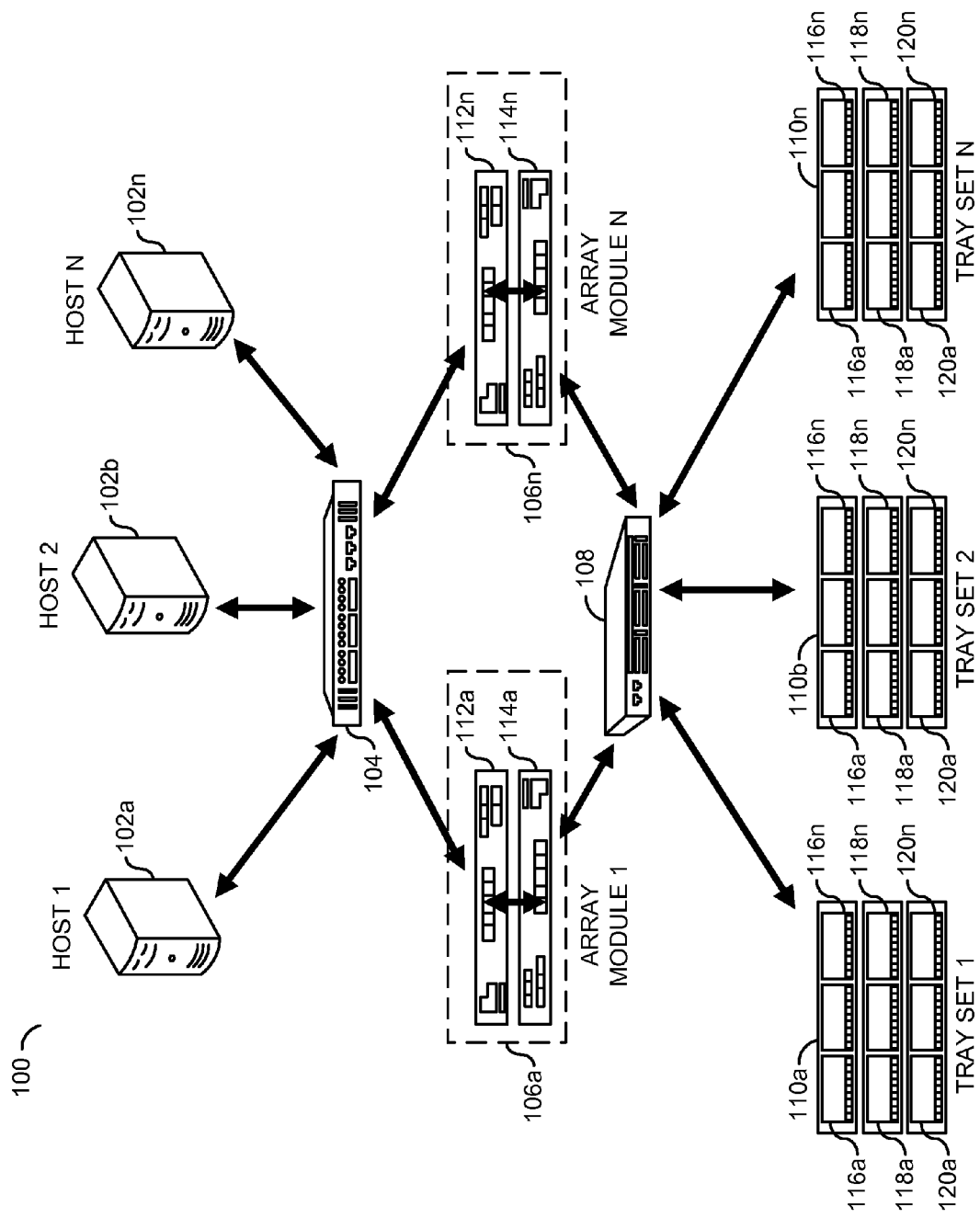
FIG. 2 is a diagram illustrating an N-way controller cluster.

Referring to FIG. 2, a graphical representation of the system 100 is shown implementing an N-way controller cluster. The system 100 may comprise ethernet and/or fibre channel (FC) based connections. The system 100 may also comprise a direct and/or a fabric attaching option for connection to drive enclosures 110a-110n. In one example, all of the controllers (e.g., controllers 112a-112n and/or the controllers 114a-114n) may be an active owner for a LUN of a particular storage array 110a-110n. In another example, selected controllers may be active owners for a LUN of a particular storage array 110a-110n. In another example, there may be one active controller and/or other passive controllers for a LUN of a particular storage array 110a-110n. A LUN cache mirror synchronization (e.g., sync) may be implemented through FC and/or Ethernet (e.g., FCoE). The controllers 112a-112n and/ or the controllers 114a-114n may act as a target for multiple initiators of different available storage protocol. A recovery mode operation may be implemented during the failure of a single controller. The recovery mode may last until the failed controller is replaced (e.g., a least access time arbitration). Global redundancy may be achieved from different controller modules 106a-106n and/or arrays 110a-110n during a failure.

The system 100 may extend controller redundancy and/or load sharing to implement an N-way clustered controller. A single controller enclosure (e.g., the array module 106) may comprise two controllers (e.g., controller 112 and controller 114). Multiple controller enclosures (e.g., blocks 106a-106n) may be grouped together to form a set of clustered controllers. The SAN infrastructure 100 may comprise numerous sets of controller modules 106a-106n, drive trays 110a-110n (e.g., enclosure modules), fabric switches 104 and 108, etc. The system 100 may provide a global redundancy using a number of active controllers 112a-112n and/or 114a-114n in a SAN cloud.

The controllers 112a-112n and/or 114a-114n may communicate to the host initiators 102a-102n through any available storage protocols (e.g., Fibre Channel (FC), Internet Small Computer System Interface (iSCSI), Serial Attached SCSI (SAS), Fibre Channel over Ethernet (FCoE), Internet Fibre Channel Protocol (iFCP), Infiniband (IB), etc). In one example, the inter-controller communication within the array modules 106a-106n may be implemented through an integrated high bandwidth PCI-E backplane. However, the particular backplane implemented may be varied to meet the design criteria of a particular implementation. The controllers 112a-112n and/or 114a-114n may communicate through FC channel, Ethernet media using FCoE, Infiniband (IB) (to achieve a higher bandwidth) and/or other protocol(s) in accordance with the design criteria of a particular implementation.

The drive enclosures 110a-110n may be directly connected to the controller enclosures 106a-106n and/or to remote controllers 112a-112n and/or 114a-114n through the fabric switches 104 and/or 108. The remote controllers 112a-112n and/or 114a-114n may access the remote drive enclosures 110a-110n. In one example, the blocks 110a-110n may be implemented as a JBOD (just a bunch of disks). In another example, the blocks 110a-110n may be implemented as a SBOD (switched bunch of disks). Other configurations of the blocks 110a-110n may be implemented to meet the design criteria of a particular implementation. The blocks 110a-110n may be used for volume management operations and may be accessed by the hosts and/or initiators 102a-102n.

In one example, a LUN for a particular storage array 110a-110n may have multiple active controllers sharing the I/O load. In another example, a LUN for a particular storage array 110a-110n may have a single active controller and/or multiple passive controllers for redundancy. The cache mirror for a LUN of a particular storage array 110a-110n may be synched with a redundant controller on the same enclosure through one or more dedicated mirror channels and/or with one or more remote controllers through either FC channel and/or over Ethernet media using FCoE and/or IB.

The controllers 112a-112n and/or 114a-114n may act as target devices for multiple initiators 102a-102n of different available storage protocols. The system 100 may implement connectivity and/or discovery operations. The standalone controller enclosure 106 may comprise a controller 112 and a controller 114. In one example, the controllers 112a-112n and/or 114a-114n may communicate through an integrated PCI-E backplane for inter-controller communication. The standalone controller module 106 may also connect to multiple remote controllers in a storage network. In one example, multiple remote controllers 112a-112n and/or 114a-114n may communicate through the Ethernet network inside the storage network. However, other types of networks may be implemented to meet the design criteria of a particular implementation.

The cache mirror for LUN of a particular storage array 110a-110n may be synched between the controllers 112a-112n and 114a-114n through a dedicated mirror channel within the mid-plane of the enclosure 106. The cache mirror for the LUN of a particular storage array 110a-110n may be synched between the standalone controller module 106 and a remote controller through the FC channels, iSCSI channels, IB channels, through Ethernet channel using FCoE packets, and/or another type of channel protocol. A user may have the option to connect local disk drive enclosures directly to the controller enclosure 106 through the drive channel. The user may also connect remote drive enclosures through the switched network in storage fabric. The drive enclosures 110a-110n may be presented as a JBOD (or SBOD, etc.) to the remote controllers. The drive enclosures 110a-110n (local or remote) may comprise a single or multiple cascaded enclosures presented as a JBOD (or SBOD, etc.).

Figure 3:
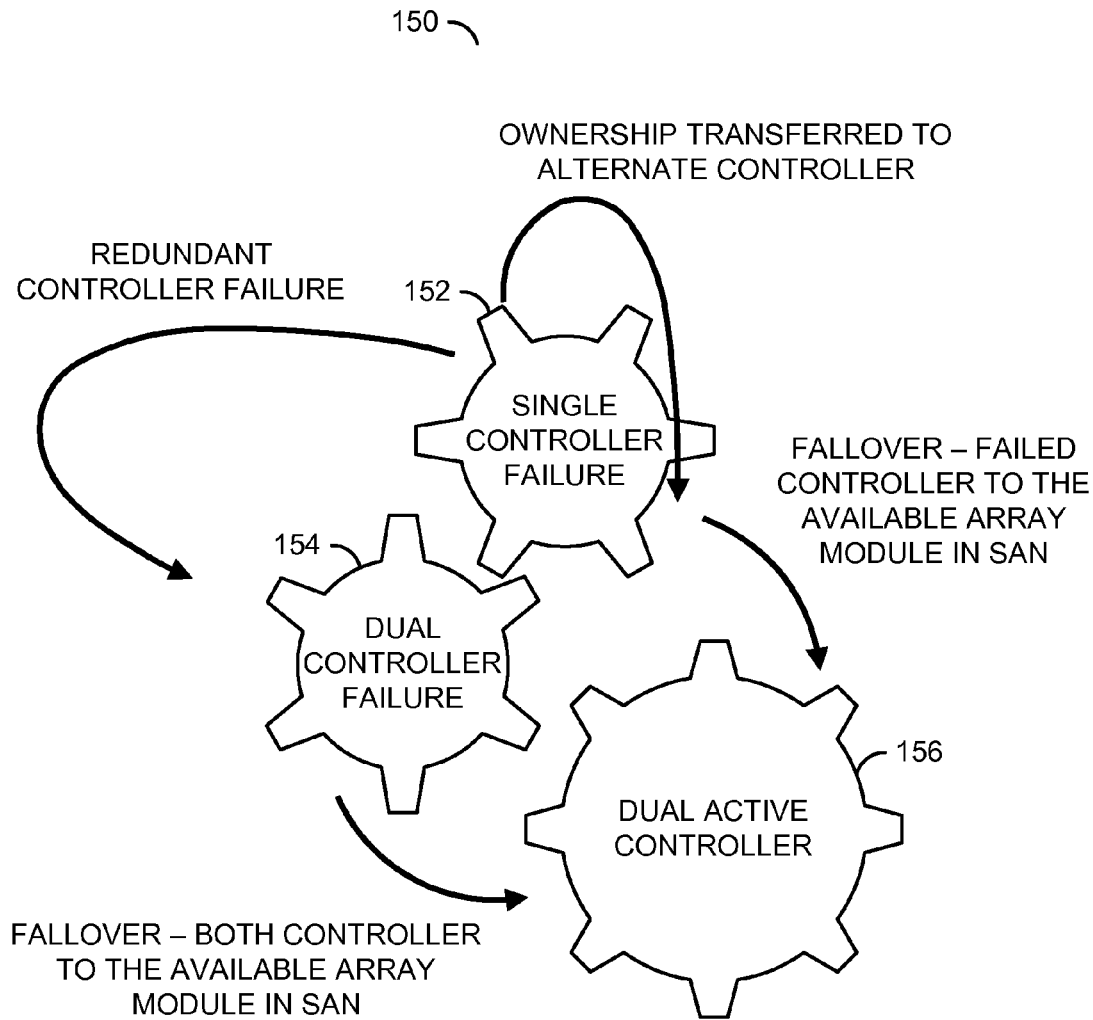
FIG. 3 is a state diagram illustrating a controller failure configuration.

Referring to FIG. 3, a state diagram 150 illustrating a controller failure is shown. The state diagram 150 generally comprises a state (or mode) 152, a state (or mode) 154 and a state (or mode) 156. The state 152 may be configured to implement single controller failure. The state 154 may be configured to implement dual controller failure. The state 156 may be configured to implement a dual active controller. The state 152 may move to the state 154 during a redundant controller failure. The state may move to the state 156 when ownership is transferred to an alternate controller. The state 152 may also move to the state 156 during failover (e.g., the failed controller may be transferred to the available array module 106a-106n in the SAN 100). The state 154 may move to the state 156 during failover (e.g., both controllers may be transferred to the available array module 106a-106n in the SAN 100).

The system 100 may globally extend controller redundancy outside the array controller module 106a using the other controller modules 106b-106n available in the SAN 100. The system 100 may maintain functionality for single or dual controller module failure. During a single controller failure, controller operation may be transferred to the redundant controllers 112a-112n and/or 114a-114n in the same array module 106a-106n. A broadcast message may be sent to all the array modules 106a-106n in the SAN 100 regarding the failure. The controller details may then be forwarded. The array module 106a may accept the broadcast message based on the controller type, load, distance, code levels, etc. The array module 106a may then send a notification to the other array modules 106b-106n. The work load from the redundant controller may be transferred. The array module with failure may operate virtually in dual active mode. Once the failure is rectified, the ownership may be transferred back to the original controller.

For a dual controller failure, a least access time arbitration may occur. The ownership may be transferred to the array modules 106a-106n in response to the failover request. Once the failure is rectified (e.g., by replacing a failed component, etc.), the ownership may be transferred back to the original controller.

The Intercontroller communication and communication with the remote cluster of controllers 106a-106n may be accomplished by implementing a communication infrastructure comprising a distributed object method invocation (e.g., DOMI) module and a remote array services (e.g., RAS) module. The DOMI module may be implemented as part of firmware in the controllers 112a-112n and/or 114a-114n. The DOMI module may provide a framework for executing a process on the remote controllers 112a-112n and/or 114a-114n that utilizes a Remote Procedure Call (RPC) mechanism. In one example, the remote controller may be the alternate controller within the same storage array. In another example, the remote controllers 112a-112n and/or 114a-114n may be controllers in a different storage array module 106a-106n. The system 100 may leverage the back end I/O interface (e.g., FC, SAS, SATA, SSD, etc.). Access to remote array modules 106a-106n and/or remote storage arrays 110a-110n may be implemented via FC, iSCSI, FCoE and/or IB host channels. However, other host channels may be implemented to meet the design criteria of a particular implementation.

The RAS may allow arrays to interact to perform enhanced services. Inter Array Communications (IAC) may provide FC driver level support for sending and receiving messages and data between array modules 106a-106n and/or storage arrays 110a-110n. A higher-level interface (e.g., a remote peer manager) may coordinate between the FC driver and clients of the RAS. The RAS may also provide communication with alternate controllers 112a-112n and/or 114a-114n. The same interfaces used to interact with remote arrays 106a-106n may be used with alternate controllers 112a-112n and/or 114a-114n.

In order to transport messages to the target object, an identifier that distinguishes messages from each other may be implemented. Three types (or more) of messages may be sent, including (i) messages that may be presented to the alternate controller without a transaction context, (ii) messages that may be presented to the alternate controller with a transaction context and/or (iii) messages that may be presented to remote controllers. The messages may be sent through an Inter Controller Communication Channel (ICON) high-level interface, the transaction interface, and/or the RAS interface.

Transaction contexts may comprise primitive data types which may be exchanged during the failover (e.g., drive failure). Examples of primitive data types may include one or more of (i) a World Wide Name (WWN) of a controller, (ii) a cache, (iii) input/outputs, and (iv) volumes owned.

The host 102 may implement an I/O handling operation. The controllers 112a-112n and/or 114a-114n may act as targets to multiple hosts 102a-102n of different available storage protocols (e.g., FC, iSCSI, SAS, FCoE, iFCP, IB, etc.). The host identifiers 102a-102n may be created and managed using a storage partition manager (e.g., SPM) module logic. The SPM module may be implemented as part of firmware of the controllers 112a-112n and/or 114a-114n. In one example, the SPM module may be used inside one of the controller enclosures 106a-106n implemented as a standalone module. In another example, the SPM module may be implemented in a cluster of two or more of the controller enclosures 106a-106n. In a clustered controller environment, the SPM information may be updated and/or synched across the clustered array modules 106a-106n.

The controller 112 and/or the controller 114 may communicate to the host initiators 102a-102n through a host channel which may support respective communication protocols. The hosts 102a-102n may use different I/O protocols to connect to one of the passive controllers and/or maintain I/O transaction. One or more passive controllers 112a-112n and/or 114a-114n may send the I/O request to the particular controller owning the LUN of a respective storage array 110a-110n. I/O transactions may be implemented through any I/O protocol from the hosts 102a-102n. The drive enclosure may have the option to connect to the controllers 112a-112n and/or 114a-114n directly using FC protocols, SAS protocols, SATA protocols, SDD protocols, or another type of protocol. In one example, a user may allow a set of cascaded SAS drive enclosures to be available to all controllers 112a-112n and/or 114a-114n in a cluster. However, other drive enclosures may be implemented to meet the design criteria of a particular implementation. In one example, an FC interposer drive channel may be added. The FC interposer drive channel may implement a set of SAS drive enclosures 106a-106n as a bunch of FC drives through the FC interposer drive channel. However, other interposer drive channels may be implemented to meet the design criteria of a particular implementation. Volume configuration and/or setup metadata may be N-way mirrored and synchronized across the drive enclosures 106a-106n. The value N may be determined based on optimal performance of a set of drives in the drive enclosures 106a-106n across the cluster network.

In one example, the LUN ownership may be configured either as multiple active controllers 112a-112n and/or 114a-114n owning a LUN for better I/O performance and load sharing. In another example, LUN ownership may be configured as one active or multiple passive controllers 112a-112n and/or 114a-114n owning the LUN for high availability alone. The number of multiple active controllers 112a-112n and/or 114a-114n may be different that the number of controllers in the N-way cluster. The number of multiple active controllers 112a-112n and/or 114a-114n may be configured by a user. The number of multiple active controllers may be greater than or equal to two, or less than or equal to N.

The controllers 112a-112n and/or 114a-114n may implement exception handling. The cache for a particular LUN may be mirrored across the controllers 112a-112n and/or 114a-114n in a clustered environment. The cache mirror may implement a dedicated mirror channel for the controllers 112a-112n and/or 114a-114n inside the same enclosure. The cache mirror for the remote controllers 112a-112n and/or 114a-114n may implement an FC channel or ethernet channel using FCoE packets. However, other types of channels may be implemented depending on the design criteria of a particular implementation. When one of the controllers 112a-112n and/or 114a-114n in same enclosure is in any of the exception conditions (e.g., reboot, firmware download, failure, absent or unplugged, in service mode, etc.), the LUN ownership may be moved to the optimal controller within the enclosure.

If both the controllers 112a-112n and/or 114a-114n in the enclosure fails or is powered down, then the ownership of LUN may be transferred to one of the passive controllers 112a-112n and/or 114a-114n selected by arbitrating the least access time among all the passive controllers 112a-112n and/or 114a-114n. In case of multiple active controllers, the I/O load may be transferred to one of the passive controller enclosures 106a-106n or distributed among other optimal active controllers 112a-112n and/or 114a-114n. When there is a fault in the inter-controller communication and the controllers 112a-112n and/or 114a-114n are not able to communicate through the integrated ethernet channel, the controllers 112a-112n and/or 114a-114n may communicate through an external ethernet channel. However, other types of channels may be implemented to meet the design criteria of a particular implementation. When both fail, the controllers 112a-112n and/or 114a-114n may enter a self lock down state to allow the LUN ownership to be transferred to available optimal controllers and to avoid a no ownership state.

The system 100 may implement a performance handling operation. The set of drive enclosures 106a-106n may connect directly to any controller enclosure drive channel. The drive enclosures 106a-106n may have a drive channel connected in parallel to a switched network to allow the remote controllers to gain access. The controllers 112a-112n and/or 114a-114n which have LUNs from the direct connection of a drive enclosure 106a-106n may acquire a higher ownership priority than the remote controllers. This may minimize performance loss. The drive enclosures 106a-106n connected to the switched network may comprise limited cascading to avoid overloaded I/O traffic through any one of the switches 104 and/or 108. Cache mirroring may comprise a dedicated mirror channel integrated inside the mid-plane of the controllers 112a-112n and/or 114a-114n using a dedicated FC or ethernet channel. However, other types of channels may be implemented to meet the design criteria of a particular implementation.

Figure 4:
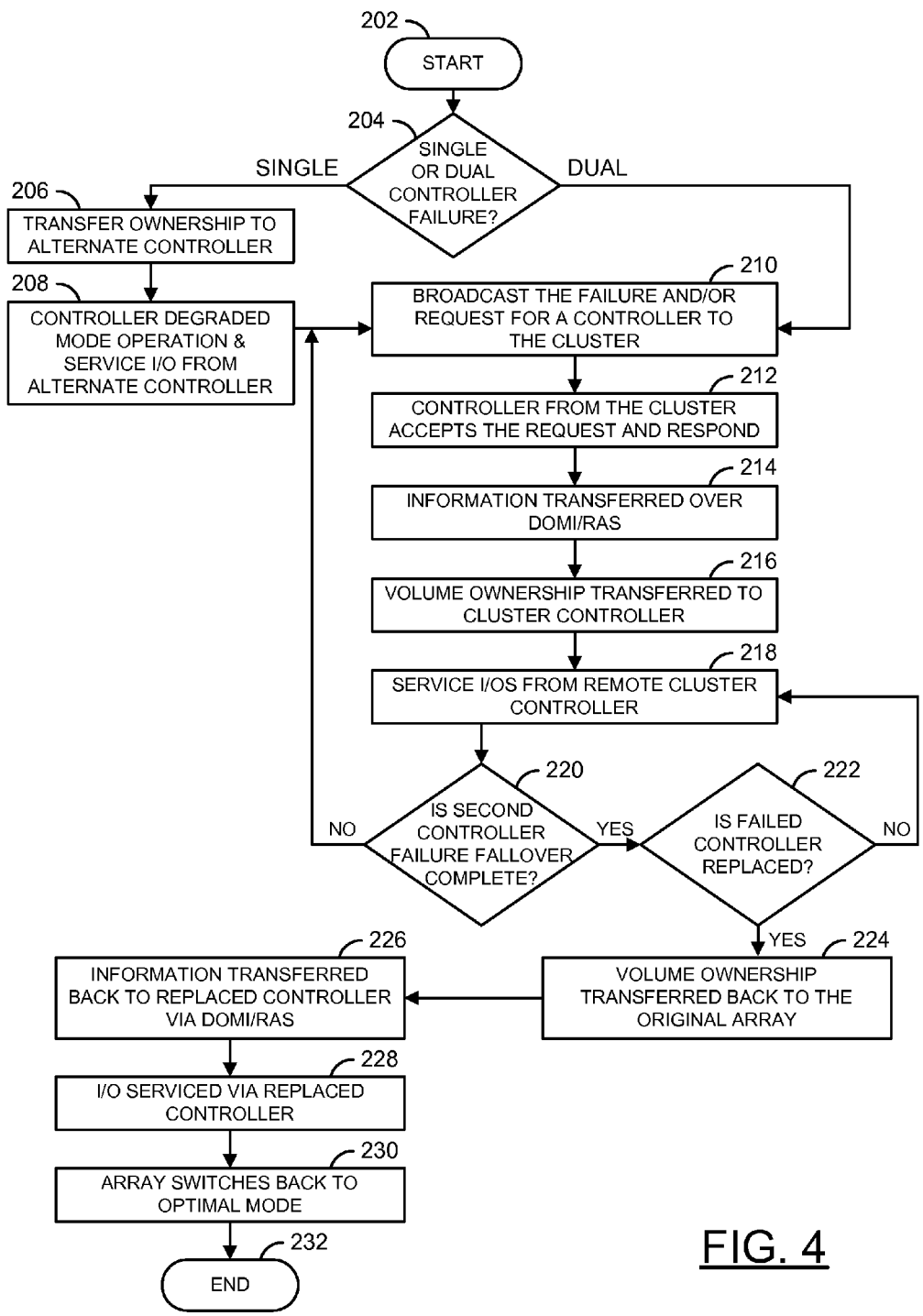
FIG. 4 is a flow diagram of a controller exception.

Referring to FIG. 4, a flow diagram of a method (or process) 200 is shown. The processor generally comprises a step (or state) 202, a decision step (or state) 204, a step (or state) 206, a step (or state) 208, a step (or state) 210, a step (or state) 212, a step (or state) 214, a step (or state) 216, a step (or state) 218, a decision step (or state) 220, a decision step (or state) 222, a step (or state) 224, a step (or state) 226, a step (or state) 228, a step (or state) 230, and a step (or state) 232.

The state 202 may be implemented as a start state. Next, the decision state 204 may determine if a controller failure is a single failure or a dual failure. If a controller failure is a single failure, the method 200 moves to the state 206. The state 206 may transfer ownership to an alternate controller. The state 208 may degrade the controller mode operation and service I/O requests from an alternate controller. The method 200 then moves to the state 210. If a controller failure is a dual failure, the method 200 moves to the state 210. The state 210 may broadcast the failure and/or request for a controller to the cluster. In the state 212, a controller from the cluster may accept the request and respond. The state 214 may transfer information over DOMI/RAS. The state 216 may transfer volume ownership to the cluster controller. The state 218 may service I/O requests from the remote cluster controller. Next, the method 200 moves to the decision state 220. The decision state 220 may determine if the second controller failure fallover is complete. If not, the method 200 moves back to the state 210. If so, the method 200 moves to the decision state 222. The decision state 222 may determine if the failed controller is replaced. If not, the method 200 moves back to the state 218. If so, the method 200 moves to the state 224. The state 224 may transfer volume ownership back to the original array. The state 226 may transfer information back to the replaced controller via DOMI/RAS. The state 228 may service I/O via the replaced controller. The state 230 may switch the array back to an optimal mode. The state 232 may be an end state.

The system 100 may (i) comprise N-way clustered controllers 112a-112n and/or 114a-114n for performance and/or redundancy, (ii) allow all available host initiator protocols to access the clustered controllers 112a-112n and/or 114a-114n, (iii) allow the set of drive enclosures 106a-106n to be directly attached to storage network fabric as a bunch of disk drives, (iv) may allow SAS, FC, SATA, SSD, and/or other drive enclosures 106a-106n to be attached to FC, iSCSI, FCoE, IB and/or other types of fabric networks, and/or (v) allow a user to select a number of active controller ownerships in an N-way cluster.

The functions performed by the diagram of FIG. 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a first of a plurality of array modules configured to connect a first one or more of a plurality of host devices to a first one or more of a plurality of storage arrays, said first array module comprising a primary controller and a secondary controller; and
   a second of a plurality of array modules configured to connect a second one or more of said plurality of host devices to a second one or more of said plurality of storage arrays, said second array module comprising a primary controller and a secondary controller, wherein (i) each of said plurality of array modules communicates through an inter-controller communication channel to transfer controller availability information between said array modules separately from said communication between said plurality of array modules and said storage arrays, and (ii) control of access to said storage arrays is transferred through said inter-controller communication channel to said secondary controller of said first array module during a failure of said primary controller of said first array module.

2. The apparatus according to claim 1, wherein said first array module and said second array module are connected to said one or more hosts through a first switch.

3. The apparatus according to claim 1, wherein said first array module and said second array module are connected to a storage array through a second switch.

4. The apparatus according to claim 1, wherein control of access to said storage is transferred to said secondary controller of said first array module during a failure of either said primary controller or said secondary controller of said second array module.

5. The apparatus according to claim 1, wherein said primary controller and said secondary controller of said first array module comprise a common Logical Unit Number (LUN) to implement load sharing.

6. The apparatus according to claim 1, wherein said first array modules and said second array modules communicate to said first host devices and said second host devices through a fiber-channel (FC) connection.

7. The apparatus according to claim 1, wherein said first array modules and said second array modules each comprise a cache mirror configured to synchronize said primary controller and said secondary controller.

8. The apparatus according to claim 1, wherein said first array module is connected to said second array module through a drive channel.

9. The apparatus according to claim 1, wherein said first array module and said second array module are connected through a switched network.

10. The apparatus according to claim 1, wherein said primary controller and said secondary controller of said first array module are directly connected to said first array module to acquire an ownership priority of ownership ahead of one or more controllers located remotely from said first array module.

11. The apparatus according to claim 1, wherein said primary controller and said secondary controller of said first array module are implemented as active controllers.

12. The apparatus according to claim 1, wherein two or more of said host devices are connected to said primary controller of said first array module.

13. The apparatus according to claim 1, wherein said apparatus enters a recovery mode during a failure of either said primary controller or said secondary controller of said second array module until said failure is resolved.

14. The apparatus according to claim 1, wherein said apparatus implements redundancy of said primary controller of said first array module by using said second array module.

15. The apparatus according to claim 1, wherein said second array module is located remotely from said first array module.

16. An apparatus comprising:
    means for connecting a first one or more of a plurality of host devices to a first one or more of a plurality of storage arrays using a first array module comprising a primary controller and a secondary controller; and
    means for connecting a second one or more of said plurality of host devices to a second one or more of said plurality of storage arrays using a second array module comprising a primary controller and a secondary controller, wherein (i) each of said plurality of array modules communicates through an inter-controller communication channel to transfer controller availability information between said array modules separately from said communication between said plurality of array modules and said storage arrays, and (ii) control of access to said storage arrays is transferred through said inter-controller communication channel to said secondary controller of said first array module during a failure of said primary controller of said first array module.

17. A method of implementing a clustered array controller for global redundancy, comprising the steps of:
    connecting a first one or more of a plurality of host devices to a first one or more of a plurality of storage arrays using a first array module comprising a primary controller and a secondary controller; and
    connecting a second one or more of said plurality of host devices to a second one or more of said plurality of storage arrays using a second array module comprising a primary controller and a secondary controller, wherein (i) each of said plurality of array modules communicates through an inter-controller communication channel to transfer controller availability information between said array modules separately from said communication between said plurality of array modules and said storage arrays, and (ii) control of access to said storage arrays is transferred through said inter-controller communication channel to said secondary controller of said first array module during a failure of said primary controller of said first array module.

18. The method according to claim 17, further comprising the step of:
    determining whether said primary controller has been replaced; and
    returning control of access to said storage arrays to said primary controller.

* * * * *